United States Patent [19]
Russ et al.

[11] Patent Number: 5,706,190
[45] Date of Patent: Jan. 6, 1998

[54] FAULT-TOLERANT HVAC SYSTEM

[75] Inventors: Robert M. Russ, Los Altos Hills; Larry A. Lincoln, Milpitas; Nir Merry, Mountain View, all of Calif.

[73] Assignee: Gas Research Institute, Chicago, Ill.

[21] Appl. No.: 623,047

[22] Filed: Mar. 28, 1996

Related U.S. Application Data

[63] Continuation of Ser. No. 598,561, Feb. 12, 1996, which is a continuation-in-part of Ser. No. 375,481, Jan. 19, 1995.

[51] Int. Cl.⁶ .................................................. G06F 19/00
[52] U.S. Cl. ......................... 364/138; 165/205; 364/505; 364/557; 364/184
[58] Field of Search ............................... 364/138, 139, 364/131–134, 505, 551.01, 557, 184–187, 506; 165/11.1, 14, 22, 32, 205, 208, 217, 287, 288, 289, DIG. 1; 236/46 R, 94; 340/825.06, 825.07

[56] References Cited

U.S. PATENT DOCUMENTS

| | | | |
|---|---|---|---|
| 4,448,033 | 5/1984 | Briccetti | 364/186 X |
| 4,843,084 | 6/1989 | Parker et al. | 364/505 |
| 4,931,948 | 6/1990 | Parker et al. | 364/505 |
| 4,942,613 | 7/1990 | Lynch | 364/146 X |
| 5,481,481 | 1/1996 | Frey et al. | 364/557 X |

*Primary Examiner*—Joseph Ruggiero
*Attorney, Agent, or Firm*—Dick and Harris

[57] ABSTRACT

A fault-tolerant HVAC system for use in a single or multi-zoned system, capable of continued operation in the event of a thermostat, or other sensing device malfunction. An HVAC controller controls the operation of an HVAC unit in accordance with a temperature signal output from the thermostat and indicative of air temperature of a conditioned space proximate the thermostat. The HVAC controller detects a thermostat malfunction and, in response thereto, instead controls the operation of the HVAC unit in accordance with a temperature sensor outputting a signal indicative of return air temperature from the conditioned space.

8 Claims, 3 Drawing Sheets

5,706,190

FAULT-TOLERANT HVAC SYSTEM

BACKGROUND OF THE INVENTION

This is a continuation of copending U.S. patent application Ser. No. 08/598,561, filed Feb. 12, 1996, which is continuation-in-part of copending U.S. patent application Ser. No. 08/375,481, filed Jan. 19, 1995.

1. Field of the Invention

The present invention relates to devices and methods for tolerating faults in HVAC systems, including the ability to maintain system operation following a thermostat malfunction.

2. The Prior Art

Many residential heating and cooling systems employ a sensing device, such as a wall mounted thermostat within a room of the conditioned space(s), as the primary source of temperature sensing, as well as for input of a desired temperature setpoint towards controlling the heating/cooling system to approximate the desired temperature. One shortcoming of such systems is that should the sensing device malfunction, or should a communication link between the sensing device and the heating/cooling system be severed, the entire HVAC system may cease operation, or may function improperly.

It would be desirable to provide a method and apparatus for detecting a sensing device ("thermostat") malfunction, and for maintaining the overall operation of a HVAC system, albeit in a potentially "degraded" mode, until thermostat operation is restored.

SUMMARY OF THE INVENTION

The present invention comprises, in part, an HVAC system capable of continued operation following a thermostat malfunction. The HVAC system includes a thermostat (or other sensing device), having an output signal indicative of air temperature of a conditioned space proximate the thermostat. Although the term thermostat will be used throughout the application, it will be understood to those with ordinary skill in the art that other types of sensing devices used in HVAC systems are also contemplated by the present disclosure. Furthermore although the present invention will be described for use with a gas-fired HVAC system, it is likewise contemplated that such an invention be used in electric systems, as well as in single or multi-zoned environments—with appropriate modifications being made, where necessary, as would be understood to those with ordinary skill in the art.

With the above in mind, an HVAC unit is provided, having a heat exchanger (when, for example, a gas system is used), a blower for moving air through the heat source, and at least one of a heating unit and a cooling unit for modifying the temperature of air passing through the heat exchanger. A discharge air plenum couples the HVAC unit to the conditioned space. The discharge air plenum provides a path for air discharge from the HVAC unit to be expelled into the conditioned space. A return air plenum also couples the conditioned space to the HVAC unit. The return air plenum provides a path for return air from the conditioned space to an inlet port of the HVAC unit. A temperature sensor is provided, having an output signal which is indicative of the return air temperature. An HVAC controller is coupled to the thermostat, the temperature sensor, and the HVAC unit. Means are provided within the HVAC controller for sensing the output signal of the thermostat, and for modifying air temperature within the conditioned space based upon the output signal of the thermostat. Means are further provided within the HVAC controller for detecting a malfunction of the thermostat. Further means are provided within the HVAC controller for sensing the output of the temperature sensor indicative of return air temperature, and for modifying air temperature within the conditioned space based upon the output signal of this temperature sensor, in response to a detected malfunction of the thermostat.

The invention further contemplates the use of positionable dampers associated with at least the discharge air plenum. In the event of a detected malfunction, the dampers will automatically orientate to at least a partially open (and preferably fully open) position.

BEST MODE FOR PRACTICING THE INVENTION

Figure 1:
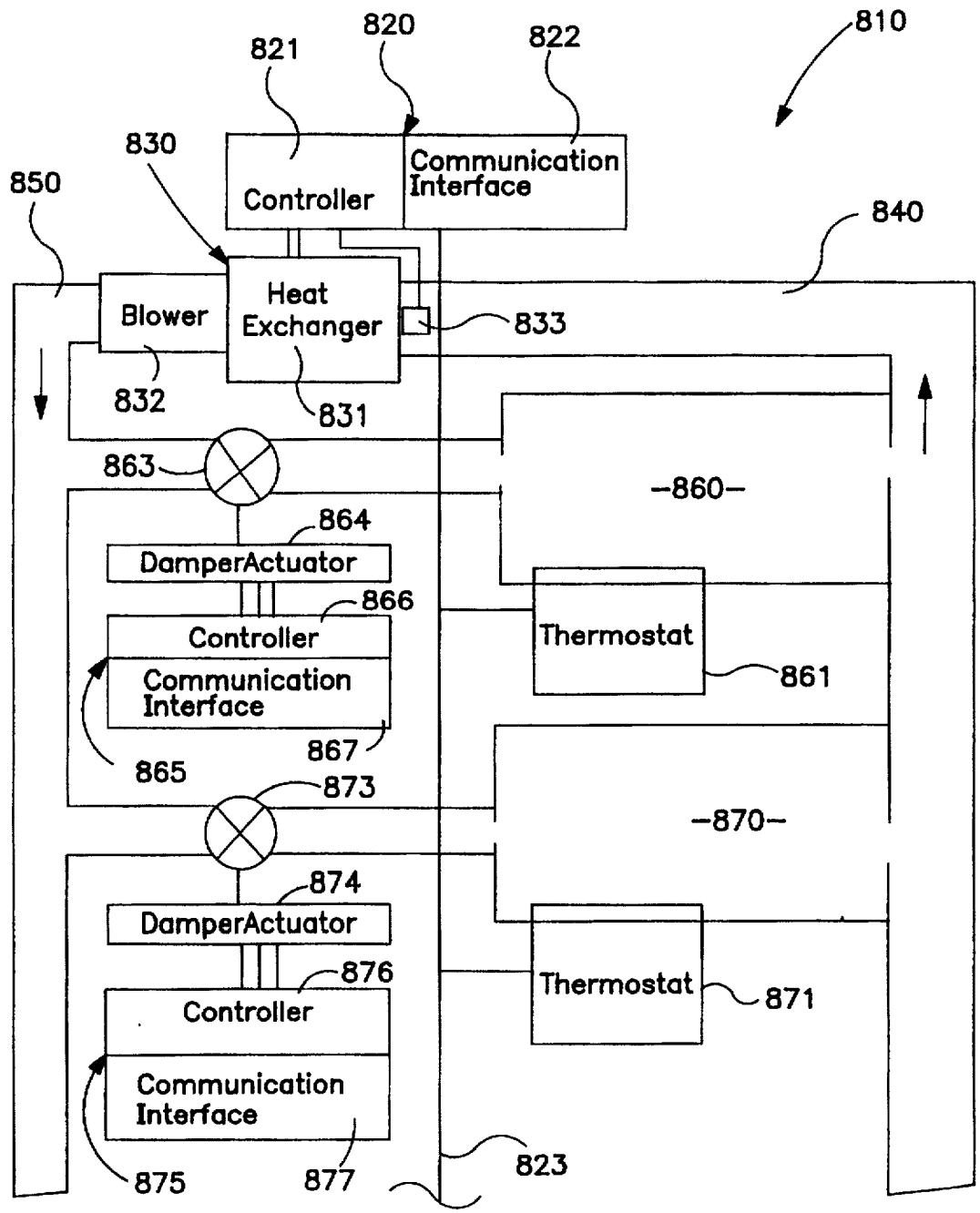
FIG. 1 of the drawings is a schematic illustration of a fault-tolerant HVAC system.

While this invention is susceptible of embodiment in many different forms, there is shown in the drawings and will be described herein in detail, several specific embodiments, with the understanding that the present invention is to be considered as an exemplification of the principles of the invention and is not intended to limit the invention to the embodiments illustrated.

A fault tolerant HVAC system 810 is shown in FIG. 1 as comprising HVAC controller 820, heating/cooling unit 830, return air plenum (duct) 840, and discharge air plenum (duct) 850. Heating/cooling unit 830 includes a source of heat and/or cold (not shown), coupled to heat exchanger 831. This may include, among other things, an electric or gas-fired furnace, and air conditioning cooling coils. This source of heat and/or cold is transferred, in large part, to breathable, circulating air passing from an inlet port to an outlet port of heat exchanger 831. Heating/cooling unit 830 further includes circulating blower 832, for moving breathable air through heat exchanger 831, as well as temperature sensor 833, which provides an output signal indicative of return air temperature passing from return air plenum 840 through the inlet port of heat exchanger 831. Return air plenum 840 provides a path for return air from one or more conditioned spaces, or zones, including zone 860 and zone 870 of FIG. 1, to the inlet port of heating/cooling unit 830.

Discharge air plenum 850 carries heated or cooled air from heating/cooling unit 830 to zones 860 and 870 (in a multi-zoned environment). Each conditioned zone has at least one associated damper. For example, damper 863 controls, in part, the percentage of air expelled by heating/cooling unit 830 into discharge air plenum 850 which is to be directed into zone 860. Similarly, damper 873 controls, in part, the percentage of air expelled into discharge air plenum 850 which is to be directed into zone 870. Each damper may be set to a substantially full open position, wherein a maximum quantity of air is allowed to pass through the damper. Each damper may further be set to a substantially full closed setting, wherein little or no air is allowed to pass through the damper. Moreover, each damper is preferably adjustable over a plurality of settings between fully open and fully closed. As will be explained, should a malfunction of the thermostat (or other sensing device) be detected, each damper will, in a preferred embodiment, automatically adjust to a fully open position.

HVAC controller 820 includes controller 821 and communication interface 822. Controller 821 may comprise a conventional microprocessor or microcontroller, including associated random accesses memory and read only memory, containing, among other things, stored program code and data for execution by the microprocessor. Communication interface 822 allows controller 821 to communicate with various remote, or peripheral devices coupled to a common communication bus 823. As shown in FIG. 1, communication bus 823 permits controller 821 to communicate with thermostat 861 (or other conventional sensing device), associated with zone 860, and with thermostat 871, associated with zone 870. Communication bus 823 further permits controller 821 to communicate with damper communication interface 867, associated with damper 863, and with damper communication interface 877, associated with damper 873.

Communication bus 823 allows controller 821 and these remote, peripheral devices, among others, to communicate by exchanging packets of digital data over the bus. For example, controller 821 may construct a digital packet of data for receipt by damper communication interface 877, containing data indicating a desired damper setting of damper 873. This packet may include, among other things, a header having a device address, or device I.D., uniquely indicative of communication interface 877. This packet may further contain a command field, indicating a command that the damper is to be adjusted, as well as a data field, indicating a particular adjustment to be made to damper 873. Each remote, or peripheral device capable of receiving data from communication bus 823, such as damper communication interface 877, will continuously monitor the data placed by any device upon communication bus 823, examining the header for a device address, or device I. D., indicative of the intended receiving device.

Similarly, controller 821 may, via communication interface 822, place data packets upon communication bus 823 requesting a sensing device, such as thermostat 861 or thermostat 871, to reply with a further data packet indicating the current air temperature proximate the thermostat and within the associated zone, or conditioned space of the thermostat. Accordingly, each thermostat includes a temperature sensor, and further includes means such as a microprocessor and a communications interface, for placing reply data indicative of the air temperature proximate the thermostat onto communication bus 823, for receipt by HVAC controller 820. While one specific type of communication system has been disclosed, it is contemplated that other conventional communication systems, such as RF links, be employed in the present invention.

HVAC controller 820 is further coupled to return air temperature sensor 833 of heating/cooling unit 830, for sensing the current temperature of the return air from return air plenum 840. HVAC controller 820 is further coupled to heating/cooling unit 830, for controlling the overall operation of the unit. For example, HVAC controller 820 may switch heating/cooling unit 830 on and off, selecting a heating or cooling operation to be initiated. HVAC controller 820 may further control the amount of heat and/or cold applied to breathable air circulating through heat exchanger 831. HVAC controller 820 may also govern the actuation, as well as the speed, of circulating blower 832, which may be of the variable speed variety.

Damper 863 includes an associated damper controller 865 and damper actuator 864. Damper controller 864 includes controller 866 and communication interface 867. Similarly, damper 873 includes an associated damper controller 875, including controller portion 876 and communication interface 877. Damper 873 further includes an associated damper actuator 874.

Each damper controller's communication interface 867, 877 is capable of receiving commands from HVAC controller 820 over communication bus 823, including commands indicative of a desired setting of the associated damper. These commands are received and processed by the controller portion 866, 876 of the damper controller, which may include a conventional microprocessor or microcontroller, together with associated random access memory and read only memory containing, among other things, program code and data for instructing the microprocessor to perform the commanded tasks relative to the associated damper.

Each damper actuator 864, 874 is preferably powered by a 24 volt alternating current supply. Moreover, each remote, or peripheral device coupled to communication bus 823, such as controllers 866 and 876, is preferably powered by a communication power line comprising a part of communication bus 823. This communication power line may, for example, comprise a conductor carrying 13.5 volts direct current. The damper controller circuitry of damper actuator 864, 874 and controller 866 and 876, are preferably constructed in a manner such that should either the 24V AC or the 13.5V DC power be lost, the associated damper 863, 873 will automatically open to their fully open orientation.

In normal operation, HVAC controller 820 will receive data indicative of the current air temperature within zone 860, as well as a desired temperature within zone 860, from thermostat 861. HVAC controller 820 will further receive data indicative of the current air temperature within zone 870, as well as a desired air temperature for zone 870, from thermostat 871. HVAC controller 820 will employ this information in controlling the operation of heating/cooling unit 830 towards modifying the air temperature in each zone to bring the measured temperature into proximity with the desired temperature setpoint for the zone. In particular, HVAC controller 820 may, among other things, activate, deactivate, and change the speed of blower 832; place heating/cooling unit 830 in a cooling mode, a heating mode, or deactivate the heating/cooling unit 830; and vary the temperature that heating/cooling unit 830 applies to circulating air passing through heat exchanger 831, such as by modulating a flame within a modulating gas-type furnace or, by adjusting the power delivered to electric coils of an electric furnace for example. HVAC controller 820 will simultaneously control the positioning of dampers 863 and 873, apportioning the air discharged from heating/cooling unit 830 into discharge air plenum 850 to the various conditioned zones. HVAC controller 820 will continually modify the operation of heating/cooling unit 830, as well as the positions of dampers 863 and 873, towards modifying the air temperature within zones 860 and 870, in an attempt to bring the air temperatures of the associated zones as close as possible to the desired temperature for these zones, as entered by a user within a user interface portion of the associated thermostat 861, 871.

Although, in the embodiment illustrated in FIG. 1, a fault-tolerant HVAC system is shown in a multi-zone controlled environment, including dampers associated with each zone, it is also contemplated that the present fault-tolerant HVAC system may be employed in association with a single-zone system. In such a single-zone system, all dampers are eliminated, and the entire conditioned space is heated and/or cooled based upon a main, or primary temperature sensor, and a main, or primary desired temperature selection, such as by thermostat 861. The entirety of the controlled space will, accordingly, receive conditioned air of approximately the same volume, at substantially the same temperature - unless the output is modulating.

Figure 2:
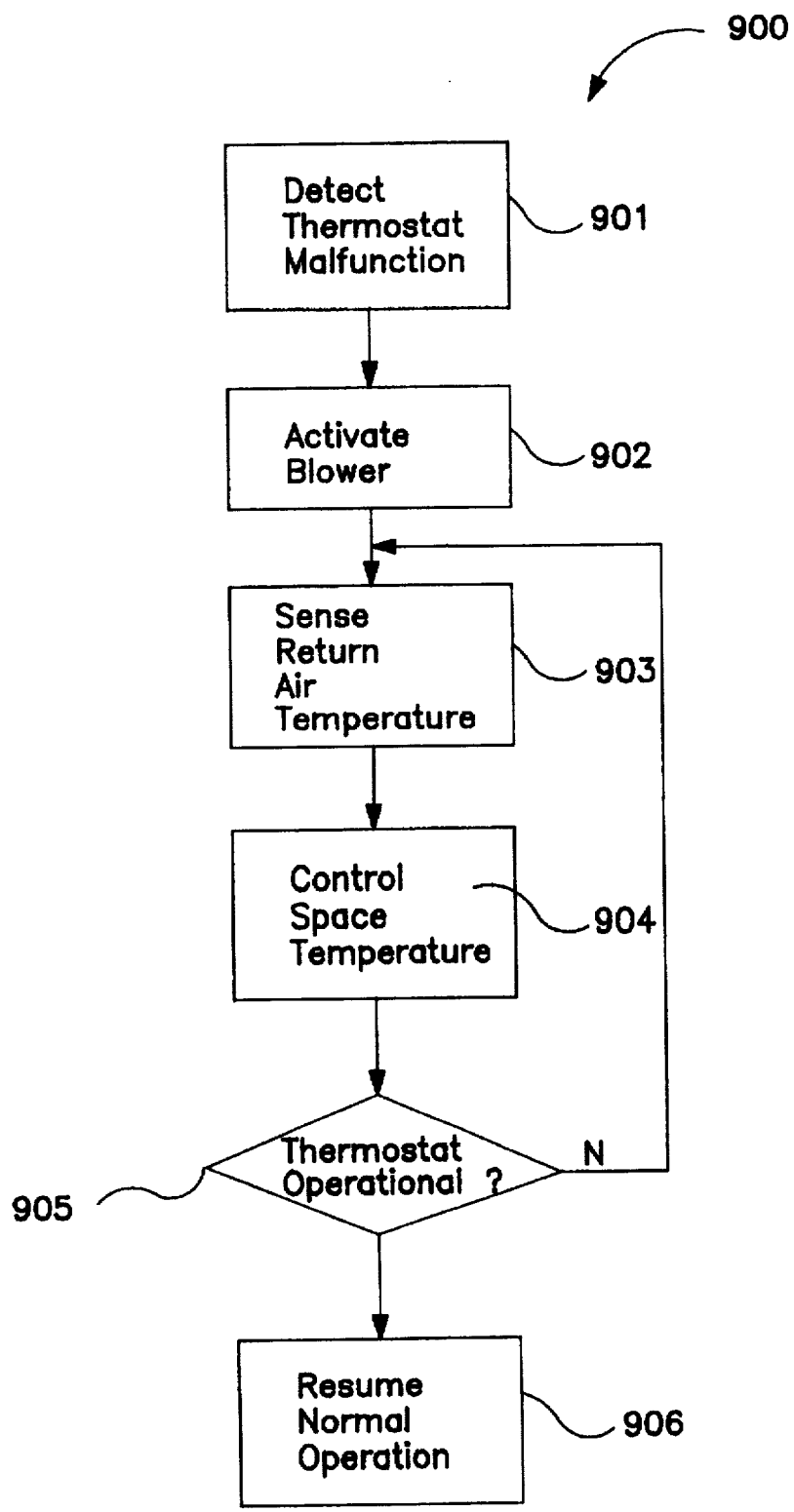
FIG. 2 of the drawings is a flow chart illustrating the steps of the continued operation of a single-zone HVAC system in the event of a thermostat malfunction.

As shown in FIG. 2, HVAC controller 820 (FIG. 1) may be programmed in a single-zone environment so as to be capable of performing a sequence of operations 900 in the event of a thermostat/sensing device malfunction, towards maintaining overall operation of the HVAC system in the event of such a malfunction. As shown in FIG. 2, step 901, the HVAC system will first detect that a thermostat malfunction has occurred. This may occur in a number of ways. For example, a thermostat may recognize its own malfunction, such as by periodically executing a self-diagnostic routine within its associated microprocessor. Upon detecting a malfunction, such as an invalid output of an associated air temperature sensor, the thermostat may place a data packet upon the communication bus for receipt by the HVAC controller, including data which indicates that a malfunction has occurred, as well as an identification of the particular type of malfunction. Moreover, the HVAC controller may detect that a thermostat has become entirely non-operational, or incapable of communicating with the HVAC controller. For example, the HVAC controller may place a data packet upon the communication bus, requesting the current temperature from the sensor associated with a particular thermostat. If the thermostat does not reply with the requested data within a predetermined period of time, the HVAC controller will presume that the particular thermostat has malfunctioned. Moreover, the HVAC controller may become incapable of communicating with a thermostat, due to an overall loss of DC power upon the communication bus, interrupting power to each of the communication controllers of the remote, peripheral devices connected to the communication bus. Should a voltage detector associated with the HVAC controller and the communication bus detect such a power interruption, the HVAC controller will treat this inability to communicate with the thermostat as a thermostat malfunction.

Should no thermostat malfunction be detected, normal operation of the single-zone HVAC system will continue, in the manner described above. Should, however, a thermostat malfunction be detected, the HVAC controller will next activate circulating blower 832 (FIG. 1), as shown in step 902 of FIG. 2 (provided, of course, that the blower was not already presently activated during the normal conditioning of the single-zone system). Blower 902 will remain activated for a predetermined and sufficient amount of time, in order to move a sufficient quantity of return air past return air temperature sensor 833 (FIG. 1) to permit a relatively accurate measurement of the return air temperature. When such a sufficient, predetermined time period has elapsed, the HVAC controller will sense the return air temperature, as shown in step 903. Next, based upon the return air temperature, HVAC controller will continue to control the temperature of the single-zone as shown in step 904. The temperature of the controlled space will be maintained essentially in the manner described above, with respect to the normal operation of the single zone system, with the exception that the return air temperature sensor 833 (FIG. 1), rather than the temperature sensor associated with the thermostat, will provide the necessary feedback for use by the HVAC controller in controlling the operation of the heating/cooling unit. The setpoint, or target temperature, could, for example, be the last desired temperature setting received as a packet of digital data from the thermostat, before it malfunctioned, or, alternatively, it could be a predetermined default setting. In other words, in the event of a detected thermostat malfunction, the return air temperature sensor, sensing air passing from the return air plenum into the inlet port of the heating/cooling unit, could be used as an approximation of the temperature which would otherwise be measured within the conditioned space, had the thermostat been functioning properly.

Next, as shown in step 905, the HVAC controller will perform a test, or an interrogation, of the malfunctioning thermostat, towards determining whether normal operation of the thermostat has resumed. The HVAC controller may, for example, detect the reapplication of power to the communication bus, following an earlier power loss which previously interrupted power to the malfunctioning thermostat. Moreover, the HVAC controller may continue to periodically place data packets upon the communication bus, requesting the current temperature from the malfunctioning thermostat. Should the malfunctioning thermostat respond properly, the thermostat will be deemed operational.

Should the thermostat continue to be deemed non-operational, a branch will be taken back to step 903, the return air temperature will be continually sensed, and the temperature of the conditioned space will continue to be controlled based upon the sensed return air temperature. If, however, the thermostat is now deemed operational, transition will be taken to step 906, and normal operation of the HVAC system will be resumed, in the manner described above.

Figure 3:
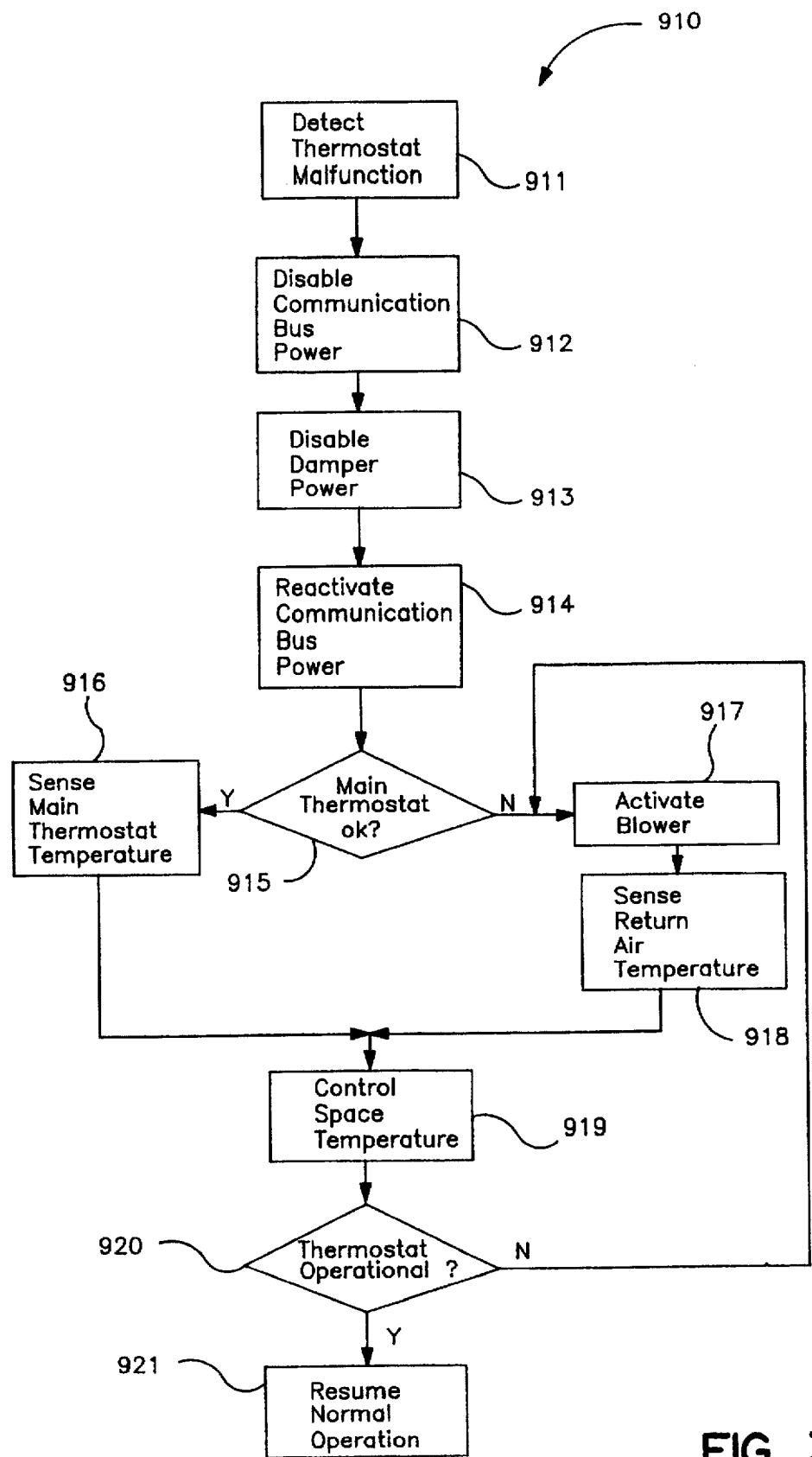
FIG. 3 of the drawings is a flow chart illustrating the steps of the continued operation of a multi-zone HVAC system in the event of a thermostat malfunction.

FIG. 3 is a flow chart showing the series of operations 910 performed by the HVAC controller in a multi-zone system, such as the multi-zone system of FIG. 1, in response to a detected thermostat malfunction. Prior to a detected thermostat malfunction, the HVAC controller will continually maintain normal operation of the HVAC system, in the manner described above with respect to multi-zone systems. The HVAC system will, for example, continue to control the operation of the heating/cooling unit, as well as the positioning of the various dampers associated with the individual zones of the overall conditioned space.

As shown in step 911 of FIG. 3, the HVAC controller is capable of detecting a thermostat malfunction, in each of the ways described above with respect to a single-zone system (i.e., a thermostat self-diagnostic detects an error; a thermostat fails to respond to a request for data; or a loss of power upon the communication bus).

Should a thermostat malfunction be detected, transition is taken to steps 912 and 913, wherein all dampers within the HVAC system are forced to a fully open condition. As shown in step 912, communication bus power is first disabled, under the control of the HVAC controller, removing power to the controlling microprocessors of each of the remote, peripheral devices. Next, as shown in step 913, the 24 volt alternating current supply to the dampers is disabled by the HVAC controller. This, in turn, forces all dampers to a substantially open condition, inasmuch as the continued application of power is generally required in order to close or partially close the dampers. Next, as shown in step 914, power to the communication bus is reapplied by the HVAC controller, enabling the continued operation of those thermostats and other remote, peripheral devices which have not malfunctioned.

Next, as shown in FIG. 3, transition is taken to step 915, and a test is performed to determine whether a main thermostat is still operational. Any of the plurality of sensing devices within a multi-zone system, such as one of thermostats 861 and 871 of FIG. 1, may be designated a main, or primary thermostat. If the malfunctioning thermostat, as detected in step 911, is not the thermostat designated as the main thermostat, and if the main thermostat is still operational (i.e., does not indicate a self-diagnostic fault and is still capable of communicating with the HVAC controller) transition is taken to step 916.

As shown in step 916, the HVAC controller will continue to control the operation of the HVAC system as in normal multi-zone operation, with the exception that all dampers are forced open (as described above), and with the further exception that the air temperature, as sensed by a temperature sensor associated with the main thermostat, is used as feedback for controlling the continued operation of the circulating blower, and other aspects of the heating/cooling unit 830. The desired temperature setpoint, as entered by a user via the main thermostat, may be used in controlling the HVAC system.

If the main thermostat is the malfunctioning thermostat, or, if the main thermostat has malfunctioned, in addition to another thermostat malfunction detected within step 911, transition is taken to step 917, and blower 832 (FIG. 1) is activated for a predetermined, sufficient period of time to enable a sufficient quantity of air to pass return air temperature sensor 833, to enable this temperature sensor to sense an approximation of the overall air temperature within the controlled zones. Following this sufficient period of blower operation, transition is taken to step 918, and the output of temperature sensor 833, indicative of the return air temperature, is sensed by the HVAC controller. Next, regardless of whether the main thermostat temperature was sensed, in step 916, or the return air temperature was sensed, in step 918, transition is taken to step 919, wherein the temperature of the entirety of the conditioned space (i.e., all zones within the multi-zone system) are simultaneously controlled based upon the sensed temperature. Next, as shown in step 920, a test is performed to determine whether the thermostat deemed malfunctioning in step 911 has resumed proper operation. If not, transition is taken to step 915, and the HVAC controller will again test to determine whether the main thermostat is operational. Otherwise, transition is taken to step 921, and normal operation of the HVAC system is resumed.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

What is claimed is:

1. An HVAC system capable of continued operation following a sensor malfunction, the HVAC system comprising:

at least one sensing device, wherein at least one of the at least one sensing device has an output signal indicative of air temperature of a conditioned space proximate a corresponding one of the at least one sensing device;

an HVAC unit having means for thermally conditioning air, and a blower for moving air;

a discharge air plenum coupling the HVAC unit to the conditioned space, the discharge air plenum providing a path for air discharged from the HVAC unit to be expelled into the conditioned space;

a return air plenum coupling the conditioned space to the HVAC unit, the return air plenum providing a path for return air from the conditioned space to an inlet port of the HVAC unit;

a temperature sensor having an output signal indicative of return air temperature;

an HVAC controller coupled to at least one of the at least one sensing device having an output signal indicative of air temperature, the temperature sensor, and the HVAC unit;

means within the HVAC controller for sensing the output signal of each of the coupled at least one sensing device and for modifying air temperature within the conditioned space based upon the output signal of each of the at least one sensing device;

means within the HVAC controller for detecting a malfunction of at least one of the coupled at least one sensing device; and means within the HVAC controller for sensing the output of the temperature sensor from the return air temperature and for modifying air temperature within the conditioned space based upon the output signal of the temperature sensor, in response to detecting a malfunction of at least one of the coupled at least one sensing device.

2. The HVAC system according to claim 1 wherein the thermal air conditioning means comprises a heat exchanger.

3. The HVAC system according to claim 1 wherein the HVAC controller is coupled to at least one of the at least one sensing device, the temperature sensor and the HVAC unit via a communication bus.

4. The HVAC system according to claim 1 wherein the HVAC controller is coupled to at least one sensing device, the temperature sensor and the HVAC unit via an RF link.

5. The HVAC system according to claim 1 further including at least one positionable air damper associated with at least the discharge air plenum.

6. The HVAC system according to claim 5 further including means to position at least one of the at least one positionable air dampers in an open orientation upon detection of a malfunction of at least one of the sensing devices.

7. The HVAC system according to claim 1 further including means for varying the speed of the blower and, in turn, the output of air through the discharge air plenum.

8. The HVAC system according to claim 1 wherein the malfunction detection means includes means for detecting a wiring fault associated with at least one of the sensing devices.

* * * * *

UNITED STATES PATENT AND TRADEMARK OFFICE
CERTIFICATE OF CORRECTION

PATENT NO. : 5,706,190
DATED : January 6, 1998
INVENTOR(S) : Russ et al.

It is certified that error appears in the above-indentified patent and that said Letters Patent is hereby corrected as shown below:

Col. 8, line 42        After "at least one" insert
                       -- of the at least one --.

Signed and Sealed this

Fifth Day of May, 1998

Attest:

BRUCE LEHMAN

Attesting Officer    Commissioner of Patents and Trademarks